United States Patent
Azdasht et al.

(10) Patent No.: US 10,695,853 B2
(45) Date of Patent: Jun. 30, 2020

(54) DEVICE FOR THE SEPARATE APPLICATION OF BONDING MATERIAL DEPOSITS

(71) Applicant: PAC TECH—PACKAGING TECHNOLOGIES GMBH, Nauen (DE)

(72) Inventors: Ghassem Azdasht, Berlin (DE); Thorsten Krause, Velten (DE)

(73) Assignee: PAC TECH—PACKAGING TECHNOLOGIES, Nauen (DE)

(*) Notice: Subject to any disclaimer, the term of this patent is extended or adjusted under 35 U.S.C. 154(b) by 0 days.

(21) Appl. No.: 15/323,808

(22) PCT Filed: Jul. 15, 2015

(86) PCT No.: PCT/EP2015/066196
§ 371 (c)(1),
(2) Date: Jan. 4, 2017

(87) PCT Pub. No.: WO2016/008941
PCT Pub. Date: Jan. 21, 2016

(65) Prior Publication Data
US 2017/0165773 A1  Jun. 15, 2017

(30) Foreign Application Priority Data
Jul. 15, 2014 (DE) .................. 10 2014 109 934

(51) Int. Cl.
*B23K 3/06* (2006.01)
*B23K 1/005* (2006.01)
(Continued)

(52) U.S. Cl.
CPC .......... *B23K 3/0623* (2013.01); *B23K 1/0016* (2013.01); *B23K 1/0056* (2013.01); *B23K 3/04* (2013.01); *B23K 2101/42* (2018.08)

(58) Field of Classification Search
CPC ................ B23K 3/0607; B23K 3/0623; B23K 26/1438; B23K 26/147; B23K 1/0016; B23K 1/0056; B23K 3/04; B23K 2101/42
(Continued)

(56) References Cited

U.S. PATENT DOCUMENTS 6,111,214 A * 8/2000 Saito .................. B23K 26/1438
219/121.6
6,152,348 A * 11/2000 Finn ...................... B23K 3/0607
228/1.1
(Continued)

FOREIGN PATENT DOCUMENTS

CN         1862895 A    11/2006
CN       103521871 A     1/2014
(Continued)

OTHER PUBLICATIONS

PCT International Search Report, PCT/EP2015/066196, dated Jan. 12, 2015.
(Continued)

*Primary Examiner* — Phuong T Nguyen
(74) *Attorney, Agent, or Firm* — Quarles & Brady LLP

(57) ABSTRACT

A device for the application of solder material deposits includes a conveying device for conveying solder material deposits from a reservoir at an upper housing part toward an application device at a lower housing part. The conveying device can be moved from a receiving position P1 to a transfer position P2, in which the solder material deposit is exposed to a pressure gas via a pressure bore formed in the upper housing part and from which the solder material deposit is transferred to an application nozzle in an application position P3. The application device includes an application duct formed in the lower housing and forms a lower section of a transmission duct which serves to transmit laser radiation to the solder in the application nozzle. The application duct is inclined at an application angle α with respect to the rotation axis.

8 Claims, 3 Drawing Sheets

(51) Int. Cl.
  *B23K 1/00* (2006.01)
  *B23K 3/04* (2006.01)
  *B23K 101/42* (2006.01)

(58) Field of Classification Search
  USPC .............. 219/121.63, 121.6, 121.64, 121.82, 219/121.65, 121.72; 228/41, 42, 33, 37, 228/45, 51, 52, 111, 202, 219, 220, 221, 228/222, 245, 246
  See application file for complete search history.

(56) References Cited

U.S. PATENT DOCUMENTS

| | | | |
|---|---|---|---|
| 6,336,581 B1 * | 1/2002 | Tuchiya | B23K 3/0615 228/245 |
| 2004/0060971 A1 | 4/2004 | Azdasht | |
| 2005/0031776 A1 | 2/2005 | Zakel et al. | |
| 2006/0237514 A1 | 10/2006 | Wagou et al. | |
| 2014/0008421 A1 | 1/2014 | Berchtold et al. | |

FOREIGN PATENT DOCUMENTS

| | | |
|---|---|---|
| DE | 19541996 A1 | 5/1997 |
| RU | 2109621 C1 | 4/1998 |
| WO | 9964167 A1 | 12/1999 |
| WO | 03024653 A1 | 3/2003 |

OTHER PUBLICATIONS

PCT English Language Translation of the International Preliminary Report on Patentability, PCT/EP2015/066196, dated Jan. 26, 2017.
China National Intellectual Property Administration, First Office Action and Search Report, Application No. 201580038885.7, dated Aug. 30, 2018, 12 pages.

* cited by examiner

DEVICE FOR THE SEPARATE APPLICATION OF BONDING MATERIAL DEPOSITS

CROSS-REFERENCE TO RELATED APPLICATIONS

This application represents the national stage entry of PCT International Application No. PCT/EP2015/066196 filed Jul. 15, 2015 and claims priority to German Patent Application No. 10 2014 109 934.5 filed Jul. 15, 2014. The contents of this application are hereby incorporated by reference as if set forth in their entirety herein.

The present invention relates to a device for the separate application of solder material deposits, in particular solder balls, comprising a conveying device for separately conveying the solder material deposits from a solder material reservoir arranged at an upper housing part of the device to an application device arranged at a lower housing part of the device, the conveying device being formed as a conveying disk which is conveyed about a rotation axis, is arranged in an accommodating space between the lower housing part and the upper housing part and which has transport holders formed as passage holes which each can be moved from a receiving position P1, in which a solder material deposit is received from the solder material reservoir, into a transfer position P2, in which the solder material deposit is exposed to pressure gas via a pressure bore formed in the upper housing part and from which the solder material deposit is transferred to an application nozzle of the application device into an application position P3, the application device having an application duct formed in the lower housing part, which simultaneously forms a lower section of a transmission duct which serves for the transmission of laser radiation to the solder material deposit arranged in the application nozzle, the transmission duct extending with an upper section through the upper housing part.

A device of the kind mentioned in the introduction is known from DE 195 41 996 A1. In the known device, the application device is arranged at the bottom side of the device, comprising an application duct which extends parallel to the rotation axis of the conveying disk. The known device is intended for the application of solder material deposits on terminal faces of substrates or electronic components, the solder material deposits being remelted after application on the terminal faces. The known device is especially suitable for applying the solder material deposits on terminal faces that are located in a plane vertical to the rotation axis, i.e. parallel to the conveying disk.

In practice, when bonding components, configurations also occur in which the terminal faces of the components or substrates to be bonded with each other are not arranged in a common plane, but form an angle between them so that the terminal faces are arranged perpendicularly to each other, for example.

In configurations of this kind, it has proved particularly advantageous if the solder material deposits arranged in the application nozzle of the application device are first partially melted and then, by application of a gas pressure, are thrown against the terminal surfaces along an application axis in such a manner that both terminal faces are wetted with the solder material deposit for producing a contact bond between the terminal faces. In the ideal case, the application axis coincides with the angle bisector of the angle formed between the terminal faces so that, in case of an angle of 90° between the terminal faces, the ideal application axis is inclined at an angle of 45° with respect to the terminal faces.

This means that, if the application axis is oriented parallel to the rotation axis of the conveying disk as in the known device, the entire device must be tilted by 45° to be able to orient the application axis at 45° to the terminal faces. Thus, the conveying disk is no longer located in a horizontal plane so that disturbances may occur during the transport of the solder material deposits held separately in the transport holders of the conveying disk.

Therefore, it is the object of the present invention to enhance the known device in such a fashion that the device permits an application of solder material deposits on terminal faces that are arranged at an angle toward each other without impairment of the function of the conveying disk.

This object is attained by a device having the features of claim 1.

In the device according to the invention, the application duct is inclined at an angle $\alpha$ with respect to the rotation axis.

The device according to the invention permits applying solder material deposits at a defined application angle with respect to the rotation axis so that an orientation of the application duct onto the desired application axis is not necessarily accompanied by a corresponding inclination of the rotation axis. The device according to the invention thus also permits arranging the conveying disk in a horizontal plane in case of an application axis that is oriented onto terminal faces to be bonded to each other and that is inclined at an angle with respect to the rotation axis so that a reliable operation of the conveying device formed as a conveying disk is ensured.

The device can be employed in a particularly advantageous and versatile fashion if the application angle $\alpha$ is between 30° and 60°.

An application angle $\alpha$ of about 45° has proved advantageous in particular for such cases in which one of the two terminal faces to be contacted with each other is arranged parallel to the conveying disk and the other terminal face is arranged at a right angle to the first terminal face, wherein slight deviations by up to 10° still allow the desired success.

In a particularly preferred embodiment example, the application duct and the transmission duct extend coaxially along a common duct axis so that no special measures need to be taken within the device for orienting the laser radiation onto a solder material deposit arranged in the application nozzle of the application duct. Thus, the upper housing part and the lower housing part of the device can be provided with flush bores for forming the application duct and the transmission duct, thereby simplifying the fabrication of the device.

It is particularly advantageous if, in a point of intersection of the duct axis and a surface of the upper housing part, a coupling device with a beam deflection device is provided which permits deflecting the laser radiation onto the duct axis so that, on the one hand, a laser source can be arranged independently and at a distance to the device and, on the other hand, the beam deflection device is easily accessible owing to the arrangement of the beam deflection device at the surface of the upper housing part, permitting a simple adjustment of the beam deflection device to different positions of the laser source so as to ensure that the beam is always deflected in such a manner that the laser radiation in the transmission duct runs parallel to the duct axis and parallel to the application axis.

Preferably, the beam deflection device is provided with a transparent cover so that the beam deflection device can be shielded against disturbing environmental influences.

It is particularly advantageous if the transmitting duct extends from a top side of the upper housing part to a bottom side of the lower housing part, the duct axis intersecting the plane of the rotation axis of the device. Thus, on the one hand, a particularly compact structure of the device is realized, which ensures that the application nozzle is located within the space delimited by the circumference of the lower housing part and thereby does not protrude beyond the circumference of the lower housing part even in case of an inclined arrangement of the application nozzle with respect to the bottom side of the lower housing part. On the other hand, the extension of the transmission duct from the top side of the upper housing part permits arranging the coupling device at the top side of the upper housing part so that it is possible to also arrange the laser source above the upper housing part in a space delimited by the circumference of the upper housing part, and thus not only the device itself but also the laser source as a component of the periphery of the device can be arranged above the device without laterally protruding beyond the device. In this way, too, the requirement of an overall space-saving design of the device is accommodated, even including the peripheral devices.

If a supply duct connecting the accommodating space of the conveying disk to the application duct extends in the plane of the rotation axis for transferring a solder material deposit from the transfer position into the application position, it is possible to design the supply duct, i.e. the path that the solder material deposit has to travel from the conveying disk to the application duct, substantially vertically as a most direct connection so that, in addition to the application of pressure gas to the solder material deposit, the conveying of the solder material deposit along the conveying path is supported by gravity. In this manner, shortest possible conveying times are achieved for the transfer of the solder material deposit from the transfer position into the application position.

In a particularly preferred embodiment, the application duct is connected to a pressure sensor via a pressure bore, said pressure sensor measuring the gas pressure in the application device between the transport holder arranged in the transfer position P2 and an application opening of the application nozzle, the application duct being separated in a gas-tight fashion from the upper section of the transmission duct by means of a transparent seal so that it can be detected by means of the pressure sensor whether a solder material deposit is located in the application position P3.

It is particularly preferred if the seal is formed as a bottom of a duct sleeve which is provided with the coupling device at its upper end. For this purpose, the duct sleeve preferably protrudes with its upper end out of the surface of the upper housing part of the device and is arranged in a receiving bore of the coupling device. Thus, the duct sleeve cannot only be used for arranging the seal in a defined manner in the transmission duct, but also for attaching the coupling device to the upper part of the device.

In the following description, a preferred embodiment of the device will be explained in more detail with reference to the drawings.

Figure 1:
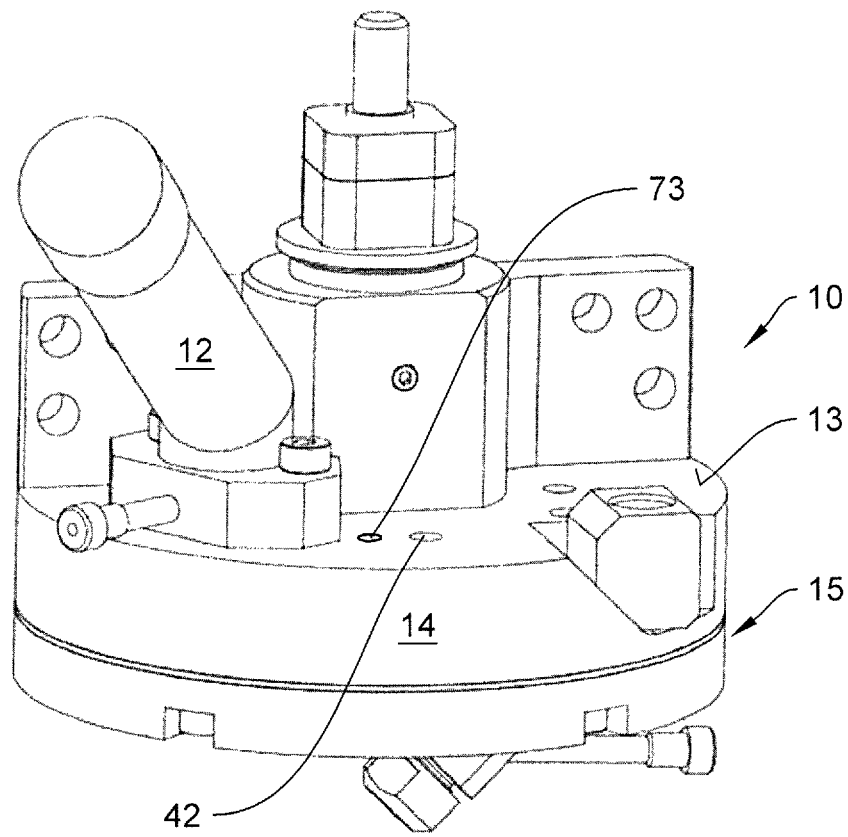
FIG. 1 shows a device for the separate application of bonding material deposits in an isometric illustration and in a lateral view.
Figure 2:
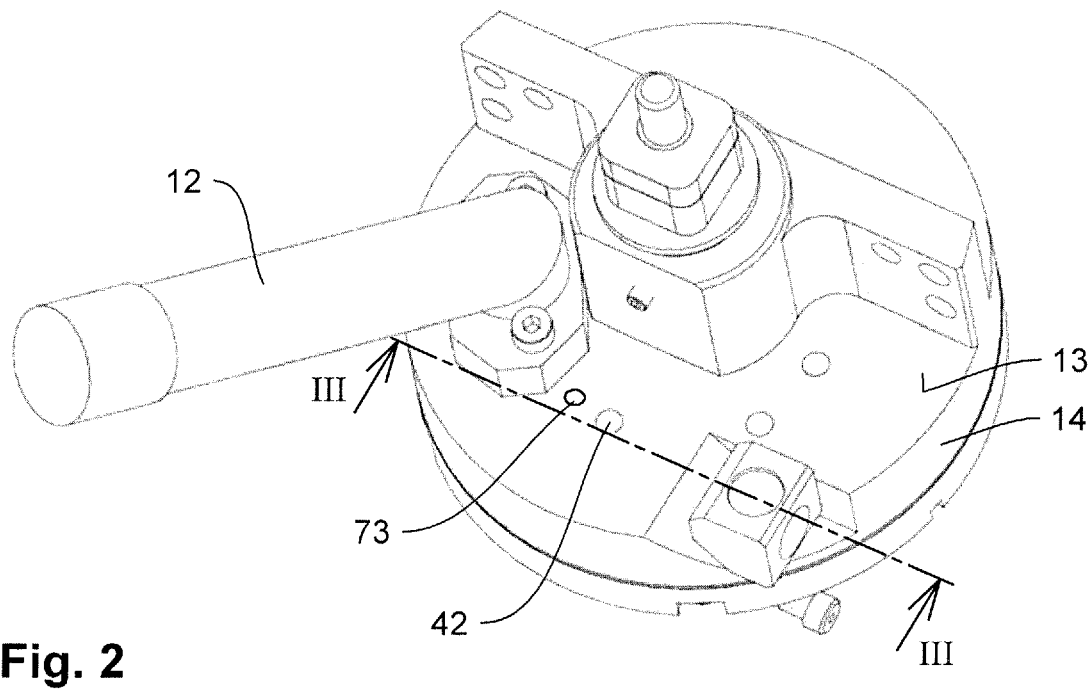
FIG. 2 shows the device illustrated in FIG. 1 in an isometric illustration and in a lateral view.
Figure 3:
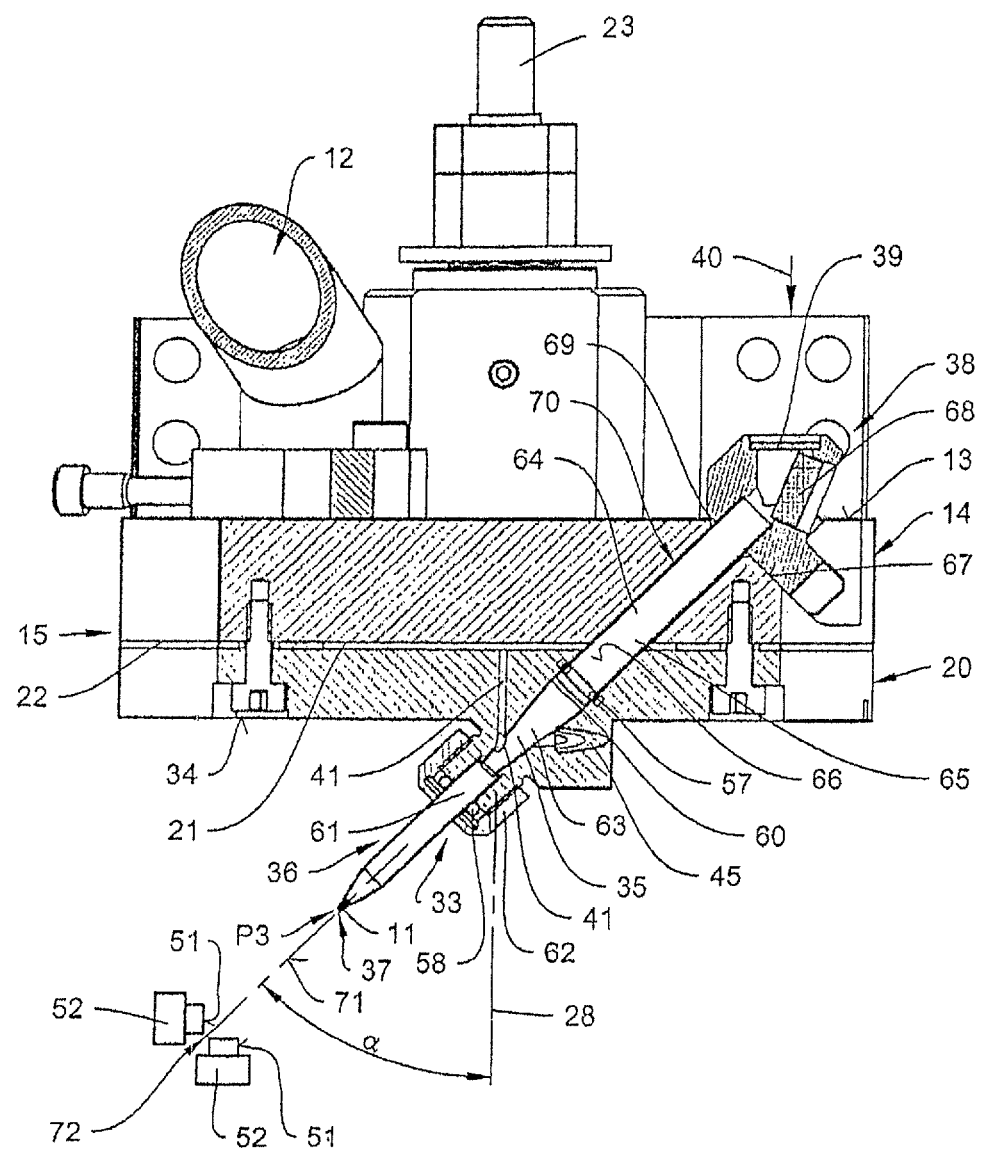
FIG. 3 shows the device illustrated in FIG. 2 in a sectional illustration along section line III-III.

In FIGS. 1 to 4, a device 10 for the separate application of solder material deposits 11 (FIG. 3) is illustrated, the solder material deposits 11 being formed as solder balls in the present case, which are held for storage in a solder material reservoir 12 which is arranged on an upper side 13 of an upper housing part 14 of a device housing 15. In the upper housing part 14, below a connection opening 16 (FIG. 4), a solder material duct 17 is formed, which makes it possible for solder material deposits 11 to travel from the solder material reservoir 12 into transport holders 18 (FIG. 4), which are formed as passage holes, of a conveying device, which is formed as a conveying disk 19 and is accommodated between the upper housing part 14 and a lower housing part 20 in an accommodating space 21 (FIG. 3). For forming the accommodating space 21, a housing ring 22 is arranged concentrically with respect to the conveying disk 19 between the upper housing part 14 and the lower housing part 20.

In the upper housing part 14, a conveying shaft 24 is located, which can be coupled at its driving end 23 to a motor drive (not illustrated) and which allows the conveying disk 19 to be driven so as to rotate about a rotation axis 28.

Figure 4:
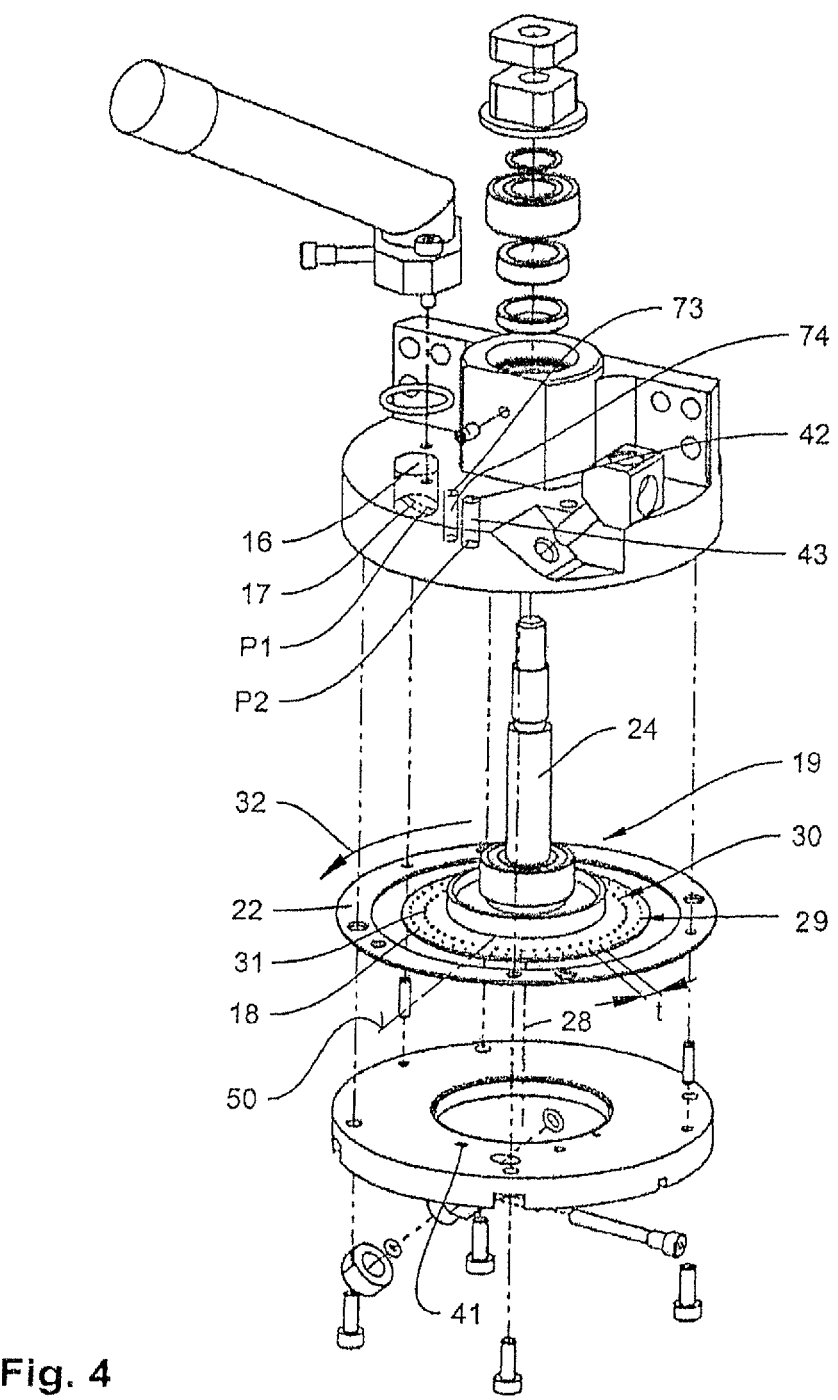
FIG. 4 shows an exploded illustration of the device.

As FIG. 4 shows, in addition to the transport holders 18, which are arranged equidistantly on a conveying circle 29 of the conveying disk 19, the conveying disk 19 has a control circle 30, which is arranged concentrically and within the conveying circle 29 in the present case and which has control bores 31 on a common radial axis 50 with the transport holders 18 in each case. Said control bores 31 interact with a light barrier device (not illustrated) arranged in the device housing 15 and permit control of a clocked conveying circle motion of the conveying disk 19 about the rotation axis 28 in such a manner that, in the conveying direction 32 of the conveying device 19, the transport holders 18 are moved forward out of a receiving position P1 below the solder material duct 17 connected to the solder material reservoir 12 each time by a graduation t of the conveying circle 29 in the conveying direction 32 and arrive in a transfer position P2 in which the transport holders 18 are located between a pressure gas duct 43, which is formed in the upper housing part 14 and is provided with a pressure gas connection 42, and a supply duct 41 (FIG. 3), which is formed in the lower housing part 20 approximately in the plane of the rotation axis 28 and which ends in the application duct 35 of the application device 33.

As shown in FIG. 3, the application device 33 has, on its lower end, an application nozzle 36 which is formed as a cannula, is arranged in an exchangeable manner on the lower housing part 20 and comprises an application opening 37 which, in the present case, has a diameter smaller than the diameter of the solder material deposits 11 so that a solder material deposit 11 transferred from the transfer position P2 to the application nozzle 36 comes to bear against an opening edge of the application opening 37 in an application position P3. The application nozzle 36 in the present case is screwed to the lower housing part 20 by means of a cap nut 62, the connection of the application nozzle 36 to the lower housing part 20 comprising a seal 58 so as to be sealed against the lower housing part 20.

As shown in FIG. 3, the application duct 35 forms a lower section 63 of a transmission duct 64 which serves to transmit laser radiation to the solder material deposit 11 arranged in the application nozzle 36, the transmission duct 64 extending with an upper section 65 through the upper housing part 14 and the application duct being inclined at an angle α with respect to the rotation axis 28. In the case of the illustrated embodiment example, the application duct 35 and the transmission duct 64 extend coaxially along a common duct axis 66 which intersects the plane of the rotation axis 28.

A coupling device 38 is arranged at the upper end of the transmission duct 64 and on the upper housing part 14 of the device 10, said coupling device being arranged in a point of intersection of the duct axis 66 and a surface 67 of the upper housing part 14 and having a beam deflection device 68 which is provided with a transparent cover 39 and allows deflection of a laser radiation 40 onto the duct axis 66, said laser radiation being emitted by a laser source (not illustrated) arranged above the device 10.

The coupling device 38 is arranged on an upper end 69 of a duct sleeve 70, said end 69 protruding out of the transmission duct 64. At its lower end protruding into the lower housing part 20, the duct sleeve 70 is sealed against the lower housing part 20 by a seal 57 formed as an O-ring in this case. The lower end of the duct sleeve 70 is additionally provided with a transparent gas-tight seal 60 which delimits a pressure chamber 61 at the top, said pressure chamber being formed in the application duct 35 above the application opening 37.

The laser radiation 40 can be applied to the solder material deposit 11 arranged in the application position P3 via the beam deflection device 68 in such a manner that the solder material deposit 11 is at least partially melted so that, by way of an application of pressure gas onto the solder material deposit 11 via the supply duct 41 ending in the application duct 35, the solder material deposit 11 can be thrown out through the application opening 37 of the application nozzle 36 and can be applied in a contact gap 72 between contact surfaces 51 of adjacent substrates 52 along an application axis 71 being flush with the duct axis 66.

For the application of pressure gas, the upper housing part 14 comprises the pressure gas connection 42 illustrated in FIG. 4, which is connected to the supply duct 41 formed in the lower housing part 20 via the pressure gas duct 43 in the upper housing part 14 above the transfer position P2. By means of the application of pressure gas to the solder material deposit 11, the solder material deposit 11 can be transferred into the application position P3 at the application opening 37 of the application nozzle 36 and the application of laser to the solder material deposit 11 arranged in the application position P3 can also be triggered indirectly via a pressure sensor (not illustrated) connected to the pressure bore 45.

Via the pressure bore 45, the pressure sensor is connected to the pressure chamber 61 defined in the application duct 35 of the application device 33 between the application opening 37 and the seal 60 of the duct sleeve 70. The pressure sensor registers an overpressure formed in the pressure chamber 61 which occurs when the application opening 37 is closed by a solder material deposit 11 arranged in the application position P3. This means, the laser application is triggered under control by the pressure sensor only if a solder material deposit 11 is located in the application position P3.

As is visible in FIGS. 1, 2 and 4, moreover, a sensor connection 73 for a light sensor (not illustrated) can be provided in the upper housing part 14 so that, for example, an optic fiber can be connected to a sensor bore 74 via the sensor connection 73 so as to be able to monitor a proper filling of the transport holders 18 with a solder material deposit 11 when they are moved past the sensor bore 74 during a rotation of the conveying disk 19 and to make the triggering of the laser application dependent on the detection of a solder material deposit 11, for example.

The invention claimed is:

1. A device for the separate application of solder material deposits, said device comprising:
    an upper housing part;
    a lower housing part;
    a conveying device for separately conveying solder material deposits from a solder material reservoir arranged at the upper housing part toward the lower housing part, the conveying device being formed as a conveying disk which is conveyed about a rotation axis, is arranged in an accommodating space between the lower housing part and the upper housing part and has transport holders formed as passage holes moving from a receiving position (P1), in which a solder material deposit is received from the solder material reservoir, into a transfer position (P2), in which the solder material deposit is exposed to a pressure gas via a pressure gas duct formed in the upper housing part;
    an application nozzle receiving the solder material deposit from the transfer position (P2) via a supply duct, such that the solder material deposit is exposed to the pressure gas in an application position (P3);
    wherein the supply duct connecting the accommodating space of the conveying disk to the application duct and extending in the plane of the rotation axis for transferring a solder material deposit from the transfer position (P2) into the application position (P3); and
    a solder material deposit application duct formed in the lower housing part and simultaneously forming a lower section of a transmission duct which transmits laser radiation to the solder material deposit received in the application nozzle, the transmission duct extending with an upper section through the upper housing part, wherein the solder material deposit application duct is inclined at an application angle ($\alpha$) with respect to the rotation axis, and the application duct and the transmission duct extend coaxially along a common duct axis.

2. The device according to claim 1, in which the application angle ($\alpha$) is between 30° and 60°.

3. The device according to claim 2, in which the application angle ($\alpha$) is about 45°.

4. The device according to claim 1, in which in a point of intersection of the duct axis and a surface of the upper housing part, a coupling device including a beam deflection device deflects laser radiation onto the duct axis.

5. The device according to claim 4, in which the beam deflection device includes a transparent cover.

6. The device according to claim 1, in which the transmission duct extends from a top side of the upper housing part to a bottom side of the lower housing part, the duct axis intersecting the plane of the rotation axis.

7. The device according to claim 1, in which the application duct is connected to a pressure sensor via a pressure bore, said pressure sensor measuring gas pressure in the application device between the transport holder arranged in the transfer position (P2) and an application opening of the application nozzle, the application duct being separated in a gas-tight manner from an upper section of the transmission duct by a transparent seal.

8. The device according to claim 7, in which the seal is formed as a bottom of a duct sleeve which is provided with a coupling device at its upper end.

* * * * *